US008830490B2

(12) United States Patent
Pouyadou et al.

(10) Patent No.: US 8,830,490 B2
(45) Date of Patent: Sep. 9, 2014

(54) USE OF SCANNER UNIT FOR PAPER TRAY PREPROCESSING

(75) Inventors: Jerome Pouyadou, Grenoble (FR); Yves Hoppenot, Notre Dame de Mesage (FR)

(73) Assignee: Xerox Corporation, Norwalk, CT (US)

( * ) Notice: Subject to any disclaimer, the term of this patent is extended or adjusted under 35 U.S.C. 154(b) by 81 days.

(21) Appl. No.: 13/471,514

(22) Filed: May 15, 2012

(65) Prior Publication Data

US 2013/0308146 A1 Nov. 21, 2013

(51) Int. Cl.
*G06K 15/00* (2006.01)

(52) U.S. Cl.
USPC ......... 358/1.12; 358/1.9; 358/1.13; 358/1.15; 358/505; 399/82

(58) Field of Classification Search
USPC ............. 358/1.13, 1.15, 1.18, 1.9, 3.28, 1.12, 358/401, 448, 505, 514, 537, 538; 399/15, 399/82
See application file for complete search history.

(56) References Cited

U.S. PATENT DOCUMENTS

| | | | | |
|---|---|---|---|---|
| 5,730,533 | A * | 3/1998 | Noy et al. | 400/104 |
| 6,032,004 | A | 2/2000 | Mirabella, Jr. et al. | |
| 6,236,831 | B1 | 5/2001 | Mei et al. | |
| 6,891,640 | B2 | 5/2005 | Kakikawa et al. | |
| 7,102,798 | B2 * | 9/2006 | Haines et al. | 358/471 |
| 7,581,800 | B2 | 9/2009 | Tanaka et al. | |
| 2004/0001131 | A1 | 1/2004 | Huang | |
| 2007/0057428 | A1 | 3/2007 | Luo | |

* cited by examiner

*Primary Examiner* — Vu B Hang
(74) *Attorney, Agent, or Firm* — Gibb & Riley, LLC

(57) ABSTRACT

Methods and systems feed print media from a print media storage device to a scanner positioned along a paper path, and feed the print media along the paper path from the scanner to a marking device positioned along the paper path. The scanner is positioned between the print media storage device and the marking device along the media path. The scanner scans the print media as the print media travels along the paper path before the print media reaches the marking device. The methods and systems control actions of the marking device based upon patterns of markings detected on the print media by the scanner using a processor operatively connected to the scanner and the marking engine, and print markings on the print media using the marking device.

16 Claims, 3 Drawing Sheets

USE OF SCANNER UNIT FOR PAPER TRAY PREPROCESSING

BACKGROUND

Embodiments herein generally relate to printers and printing systems and more particularly to using devices and methods to check print media before the print media reaches the marking device of the printer.

Most print devices are usually equipped with many sensors to check, for example, if paper is available in the adequate paper trays, if the sheet size matches that of the printed document, or if the sheets travel correctly within the machine. In any event, the printer control system assumes that the sheets inserted or stacked in their paper trays are blank and ready to use without further analysis.

However, this is not always the case. For example, one may want to recycle paper for environmental reasons, or may want to use pre-printed paper, such as forms or other materials. In those cases, the user usually resorts to trial and error before actually achieving correct printing, because correct disposition of pre-printed paper is usually awkward, resulting in lost paper, printing delays, and generally unsatisfying user experiences.

SUMMARY

Various exemplary methods herein feed print media from a print media storage device to a paper path of a printing device, feed the print media along the paper path from the print media storage to a scanner positioned along the paper path, and feed the print media along the paper path from the scanner to a marking device positioned along the paper path. The scanner is positioned between the print media storage device and the marking device along the media path. The scanner is used to scan the print media as the print media travels along the paper path, before the print media reaches the marking device, and thereby produces scanned data.

These various methods then can recognize patterns of markings and/or perform optical character recognition on the scanned data using a processor operatively connected to the scanner and the marking engine. Then these methods control actions of the marking device based upon the patterns of markings or the characters detected during the optical character recognition (using the processor) and print markings on the print media using the marking device.

The methods herein can match the orientation of markings on the first side of the print media to an orientation of print markings to be printed on the second side of the print media (by the marking device) on a sheet-by-sheet basis to provide the same printing orientation on the first side and the second side of the sheets of print media. Similarly, the methods herein can detect the presence of a pre-printed form on the print media, and align printing performed by the marking device with the patterns detected, such as the form pattern, using the processor. Additionally, the methods herein can change the content of printing performed by the marking device depending upon details of the patterns detected and the characters detected during the optical character recognition.

A printing apparatus embodiment herein comprises a print media storage device, and a paper path adjacent the print media storage device. The print media travels along the paper path after being removed from the print media storage device. Further, a marking device is positioned along the paper path. The marking device prints markings on the print media as the print media travels along the paper path. Also, a scanner is positioned along the paper path between the print media storage device and the marking device. The scanner scans the print media as the print media travels along the paper path before the print media reaches the marking device. A processor is operatively connected to the scanner and the marking engine. The processor controls actions of the marking device based upon patterns of markings detected on the print media by the scanner.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, print devices are usually equipped with many sensors, and printer control systems assume that the sheets inserted or stacked in their print media trays are blank and ready to use, which is not always the case. If a user wants to use pre-printed print media, the user is usually required to resort to trial and error before actually achieving correct printing.

In view of this, the methods and systems herein use a scan bar on printer peripherals for advanced print media validation. In particular, the methods and systems herein can print media drawn from the print media trays before the submitted content is actually printed on the print media. In this case, the methods and systems herein validate the physical aspect of the print media (size, marking, texture . . . ) before printing or to adapt printing according to various constraints.

Figure 1:
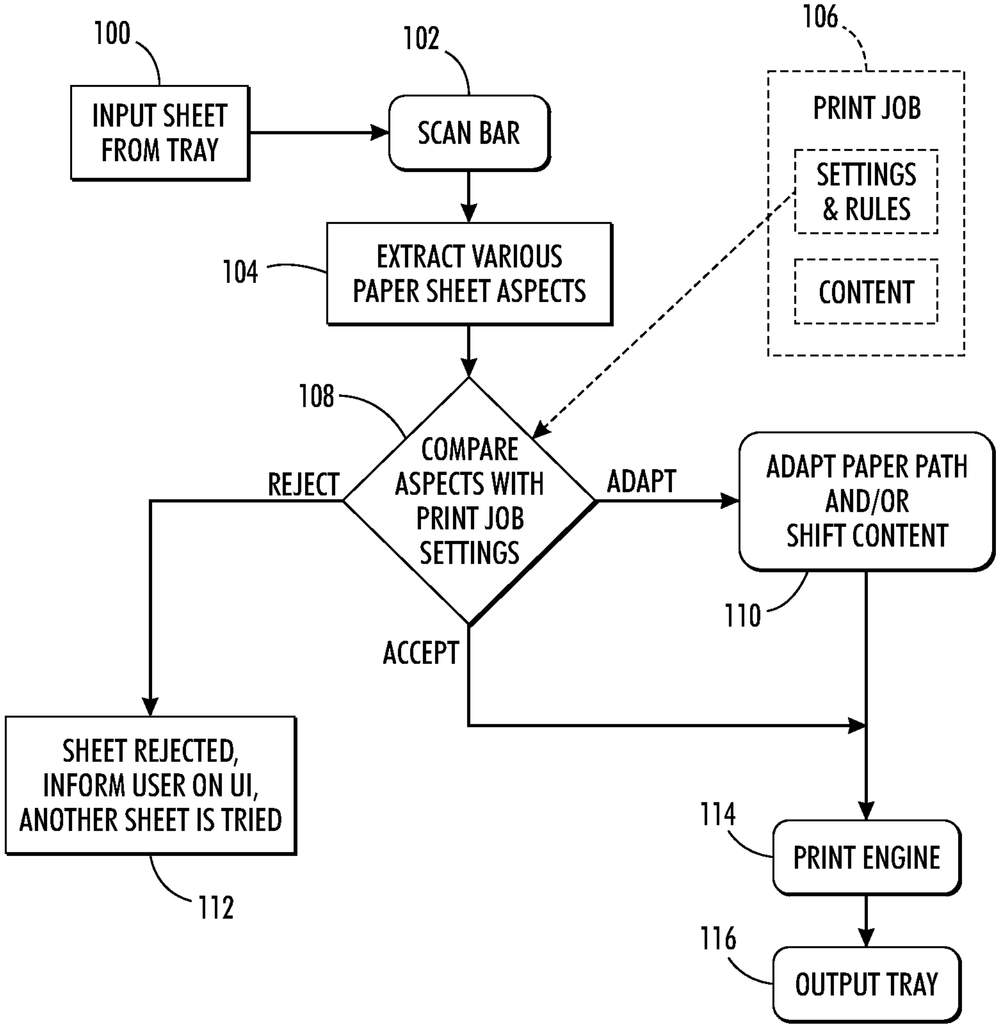
FIG. 1 is a flow diagram illustrating various embodiments herein.

FIG. 1 is a diagram summarizing the print media sheet travel within a multifunction printer using systems and methods herein. As shown in FIG. 1, the print media sheet goes through the scanner unit 102 when the print request starts and the print media leaves the tray 100. Based on the generated image, a process analyzes several physical aspects of the sheet (like size, ratio, marks, texture and other) 104. By comparing results (item 108) with print job settings and rules 106, various situations may occur. For example, in one situation if a scanned sheet is determined (by decision diamond 108) to be acceptable for the settings and rules of the print job 106, the print sheet can be used in the print engine 114, which outputs the printed sheet to the output tray 116.

In another situation, decision diamond 108 may determine that the print media sheet may not correspond to settings and adaptation rules, in which case the sheet can be ejected 112, the user informed (computer popup or printer user interface (UI)) and another sheet can be tried. Optionally, the user can validate the retry or change the tray settings. For example, the print media sheet may already contain markings because it may come from the draft tray. However, the print job may not be set to draft mode, so a non-draft print job could not be printed on the back side of the draft print media sheet containing previous markings (as draft mode would print), which would cause the media to be ejected.

In a different situation, decision diamond 108 may determine that the print media sheet may not correspond to the settings 106, but adaptation rules 110 can adjust settings for the sheet, for example by physically moving print media before printing (reversing the print media side, for example) or digitally by shifting the print job content. Then, the print job can be printed using the print engine 114, the user can be informed about changes, and the printed sheet is delivered to the output tray 116. For example, a print media sheet may already contain markings because it may come from the draft tray. The print job may be set to draft mode, so it could print on the back side of the draft print media sheet. The print media sheet can then be reversed in the printer through the duplex path, and then the back side is scanned and analyzed. If the back side is blank, the document can then be printed 114 and output 116.

Various usage situations of the systems and methods herein are described next. The first usage to be described is of controlling print media in the input tray that is not completely blank. This is particularly useful for environmentally-conscious users who are willing to make use of one side only of used print media (already printed on, or containing at least some markings) to print out draft or otherwise short-lived versions of documents. A very common situation is for a user to put a stack of documents that have been previously printed on one side in the sheet tray so as to avoid wasting blank sheets of print media, only to discover that, because the stack was put with the wrong sheet side showing, the printer has overwritten the side that was already used, thus wasting ink and energy in the process.

The systems and methods herein address this situation by scanning the sheets fed from the input tray. The scanner would not necessarily need, for the purpose of discovering the 'blank status' of the page, to apply any kind of complex pattern recognition. It would be sufficient to spot a surface whose marking coverage if greater than a given, presumably low threshold. Considering that a full page of printed text is usually considered to cover around 5% of a page, a threshold of 0.5 to 1%, or even less can be considered by embodiments herein to be an acceptable indicator that a side of a sheet contains markings.

Once the page has been deemed to have previous markings, several possibilities could arise based on the device interactive capabilities. In one case, rules attached with the print job can automatically route the decision, but if these rules do not address this situation, printers equipped with an adequate user interface can be offered some choices to let them decide the outcome of the job. For example, some of the choices that are provided to the user with systems and methods herein include ejecting the pre-printed sheets until a blank sheet is found; using the duplexing engine to attempt to write on the other side of the sheet, if it is blank; pausing the job at its current processing point, and giving the user the opportunity to restart the paused print job once the print media tray has been reloaded correctly. Other types of corrections can be applied by systems and methods herein, either automatically by the printer, or enforced by pre-established rules.

A convenient additional feature provided by the systems and methods herein is printing, on the previously-printed side of the sheet, some very visible marker (such as, an X letter covering all or part of the page). This would help users in some common situations, such as that of re-printing a draft version of a document. In that case, the previous version and the current one can look very similar at first glance. Adding a marker helps the user immediately know which side is the most recently printed.

Additionally, the systems and methods herein can perform more complex processing of the scanner's output, to provide more sophisticated usages of input scanning. Printed print media detection, as it is called to differentiate it from blank print media detection, uses the same scanning devices, but adds pattern recognition techniques in the broadest sense (optical character recognition (OCR), image analysis, printable area detection, and the like) in order to actually make use of the information from the printed areas, and not avoid using them.

For example, the systems and methods herein provide duplex control of manually inserted print media. This mode is useful when printing a document in manual duplex mode using the manual tray, starting with blank print media (for example, to use a print media of particular weight). Manual duplex mode is a mode that can be used in several situations, such as: under the printing application supervision, for example to fine-tune the usage of different print medias for a given job, or when some sections only have to be duplex-printed; to allow duplex printing for devices that do not support duplex features or where the print media is too thick to be automatically reversed; etc. In manual duplexing, the user inserts the print media manually for each sheet side, or alternatively prints all odd pages first and then re-presents the print media stack to the printer to print all even pages. In either mode, the printer pauses between sheet insertions (possibly of its own, or under the supervision of the printing application, depending on the actual printer/application combination).

However, when performing manual duplexing, the user might mistakenly insert the print media with the wrong side showing, or dispose it in such a way that the sheet, even presenting the blank side to the print engine, would be positioned upside-down. Since all printed data pertains to the same job, the printer would know the content of the previous sheet(s), and OCR or image matching techniques would be applied to the scanned data so as to automatically orient printing in the correct direction, based on the comparison with the raster image of the last printed page. Even if the sheets were reinserted out of order by the user during the manual duplexing, the scanning allows the printer's processor to match up the corresponding odd page to the correct even page, to ensure the duplex job printed the correct corresponding odd and even pages on the same sheet.

Another exemplary complex processing of the scanner's output performed by the systems and methods herein includes pre-printed print media signature matching. In this variant, the job contains settings telling the printer that pre-printed print media is to be used (for example containing the company headers, footers, logo, forms, etc.). The input scanner checks that the printed surface matches the expected pre-printed print media signature, which may be embedded in the job or may have been uploaded onto the printer's internal database beforehand. If the print media signature does not match that of the job, the print job can be put on hold, waiting for some user decision (print as-is, reload print media, change tray, ignore alert, etc.).

Alternatively, if an entirely blank sheet is detected by the scanner when letterhead or other form document was required by the print job, an automated decision to print the company standard letterhead (or other form document information) can be enforced, based on the document printed area analysis, so as to make sure the original data remains legible. Optionally, the merged result could then be presented to the user on the printer's graphical user interface to validate the result before printing.

The systems and methods herein also provide for pre-printed print media feature insertion, which combines the above modes with security or convenience features. Typically, after verification that the input sheet contains appropriate pre-printed material, hidden security tags can be embedded in known areas of the pre-printed section (for example using a combination of micro print mechanisms and adequate ink control, or using special inks (UV, gloss, etc.) or coloration schemes, depending on the device capabilities.

Filling of known areas with some standardized values, such as print date, user name, department name, document name, checksum and so are also implemented using the systems and methods herein. This so called variable-print technique is based on the use of adequate templates, designed by approved users and stored previously in the device or on a device-accessible external server. One advantage is that the input document would not need to contain any specific placeholders for such information, these having the drawback of disrupting the display of the editing application when viewing the document on screen. Similar techniques are used by systems and methods herein to print elements at the right place of a pre-printed form, like the ones used in healthcare. Area coverage for security reasons can also benefit of this kind of technique.

The systems and methods herein also provide for specific print media type detection. By using specific scan bar and/or specific illumination, the print media type, such as gloss or texture can be detected. This complements the previously described aspects, and allows the scan bar to also control such physical aspect of the print media. With such detection print job settings can easily be evaluated.

Further, official pre-printed documents (with or without security embedded in print media) can be checked in the same manner. Visible or invisible marks can be detected by the input tray scan bar in order to validate official pre-printed sheets. If the validation is correct, the official content can be printed.

With systems and methods herein, the scan bar validates the input print media sheet aspect and adapts the way printing is performed. Further, to save costs, the scanners used by systems and methods herein can be relatively less expensive (and of relatively low quality) because such scanners are used only to detect whether or not there are marks on print media. Alternatively, the scanners could be relatively more expensive and of high quality in order to do OCR or specific light spectrum detection (infrared for example).

Figure 2:
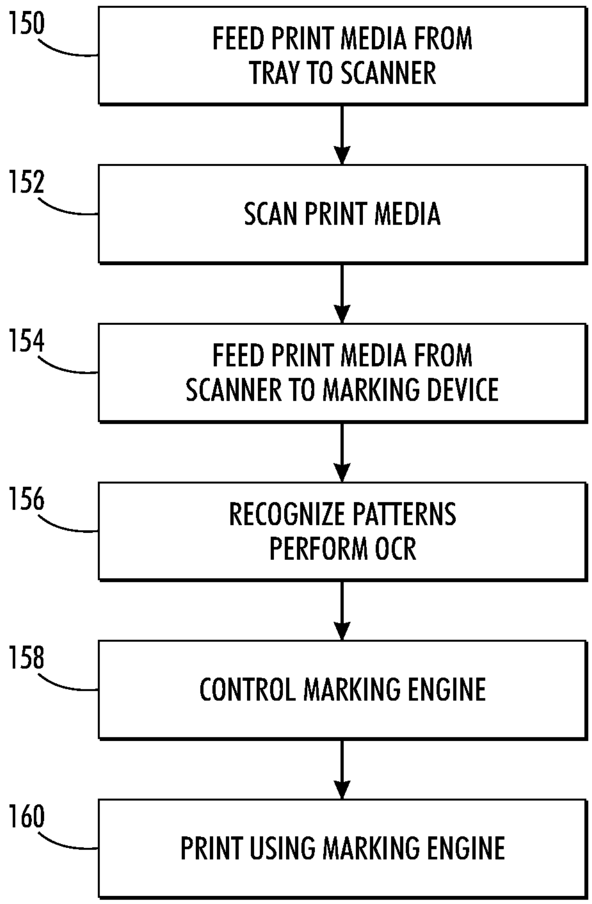
FIG. 2 is a flow diagram illustrating various embodiments herein.

FIG. 2 is a flowchart illustrating various exemplary methods herein. In item 150, such processes feed print media from a print media storage device to a paper path of a printing device and feed the print media along the paper path from the print media storage to a scanner positioned along the paper path. The scanner is positioned between the print media storage device and the marking device along the media path. The scanner is used to scan the print media as the print media travels along the paper path in item 152, before the print media reaches the marking device, and thereby produces scanned data. In item 154, the print media is fed along the paper path from the scanner to the marking device.

These various methods then can recognize patterns of markings and/or perform optical character recognition on the scanned data in item 156, using a processor operatively connected to the scanner and the marking engine. Then, these methods control actions of the marking device based upon the patterns of markings or the characters detected during the optical character recognition in item 158 (using the processor).

More specifically, in item 158, such methods herein can match the orientation of markings on the first side of the print media to an orientation of print markings to be printed on the second side of the print media (by the marking device) on a sheet-by-sheet basis to provide the same printing orientation on the first side and the second side of the sheets of print media. Similarly, the methods herein can detect the presence of a pre-printed form on the print media, and align printing performed by the marking device with the patterns detected, such as the form pattern, using the processor. Additionally, the methods herein can change the content of printing performed by the marking device depending upon details of the patterns detected and the characters detected during the optical character recognition. Finally, in item 160, such methods print markings on the print media using the marking device.

Therefore, the systems and methods herein do more than determine whether draft media is being used (or is properly oriented) because the embodiments described herein can change the orientation of the printing to accommodate the orientation of the previous markings on the previously printed sheet, can check content of the previously printed sheet to logically determine what additional printing should be added to (the current or opposing side) of the sheet, etc. Therefore, the methods and systems herein can automatically print a logo or letterhead on blank sheets that should have contained the logo or letterhead, can reorder the second-side pages of a duplex print job if the user manually loads the sheets in the incorrect order, can reorient printing or flip sheets if the previously printed sheets are loaded incorrectly, can determine if the correct texture of paper is being used (and adjust printing colors levels, contrast, tint, etc., to accommodate for improperly loaded paper types (e.g., flat paper loaded, when the original print job calls for glossy paper)), can adjust (or reorient) the printing to accommodate the position of blanks in a pre-printed form that is loaded into the paper tray, etc. Further, all actions described herein can be preformed automatically, without requiring any decisions by the operator/user; or each decision can be presented to the operator/user through the printer or other computerized device's user interface.

Figure 3:
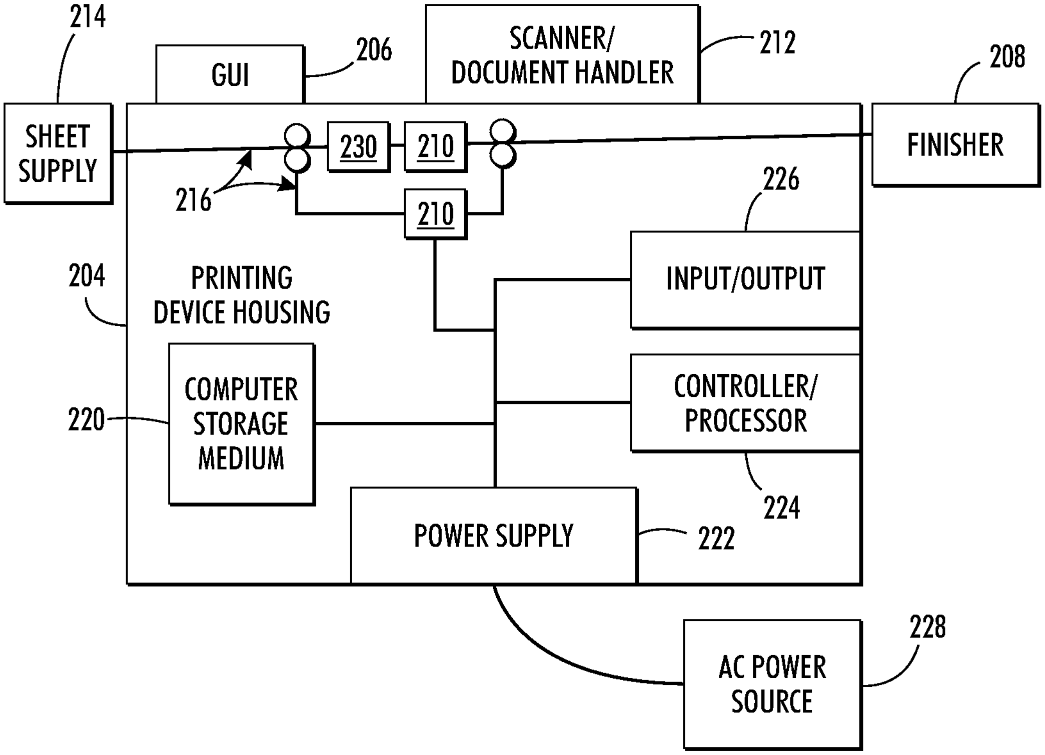
FIG. 3 is a side-view schematic diagram of a device according to embodiments herein.

FIG. 3 illustrates a printing device that is a printing device 204, which can be used with embodiments herein and can comprise, for example, a printer, copier, multi-function machine, multi-function device (MFD), etc. The printing device 204 includes a controller/processor 224 and a communications port (input/output) 226 operatively connected to the processor 224 and to a computerized network external to the printing device 204. Also, the printing device 204 can include at least one accessory functional component, such as a graphic user interface assembly 206 that also operate on the power supplied from the external power source 228 (through the power supply 222).

The printing device 204 includes at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

The input/output device 226 is used for communications to and from the printing device 204. The processor 224 controls the various actions of the printing device. A non-transitory computer storage medium device 220 (which can be optical, magnetic, capacitor based, etc.) is readable by the processor 224 and stores instructions that the processor 224 executes to allow the printing device to perform its various functions, such as those described herein. Thus, as shown in FIG. 3, a body housing 204 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Therefore, as shown above, such a printing apparatus embodiment herein comprises a print media storage device 214, and a paper path 216 adjacent the print media storage device 214. The print media travels along the paper path 216 after being removed from the print media storage device 214. Further, a marking device 210 is positioned along the paper path 216. The marking device 210 prints markings on the print media as the print media travels along the paper path 216. Also, a scanner 230 is positioned along the paper path 216 between the print media storage device 214 and the marking device 210. The scanner 230 scans the print media as the print media travels along the paper path 216 before the print media reaches the marking device 210. A processor 224 is operatively connected to the scanner 230 and the marking engine 210. The processor 224 controls actions of the marking device 210 based upon patterns of markings detected on the print media by the scanner 230.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as “right”, “left”, “vertical”, “horizontal”, “top”, “bottom”, “upper”, “lower”, “under”, “below”, “underlying”, “over”, “overlying”, “parallel”, “perpendicular”, etc., used herein are understood to be relative locations as they are oriented and illustrated in the drawings (unless otherwise indicated). Terms such as “touching”, “on”, “in direct contact”, “abutting”, “directly adjacent to”, etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:

receiving, in a printing device, a print job comprising content for use on pre-printed media, said pre-printed media having pre-printed markings thereon prior to printing said print job;

feeding print media from a print media storage device to a paper path of said printing device;

feeding said print media along said paper path from said print media storage to a scanner positioned along said paper path;

feeding said print media along said paper path from said scanner to a marking device positioned along said paper path, said scanner being positioned between said print media storage device and said marking device along said paper path, said scanner scanning said print media as said print media travels along said paper path before said print media reaches said marking device to determine whether said pre-printed markings are present on said print media;

controlling actions of said marking device based upon patterns of markings detected on said print media by said scanner to change said content of said print job by selectively adding said pre-printed markings to said content based on said pre-printed markings not being present on said print media using a processor operatively connected to said scanner and said marking device; and printing said print job on said print media using said marking device.

2. The method according to claim 1, further comprising matching an orientation of markings on a first side of said print media to an orientation of print markings to be printed on a second side of said print media by said marking device on a sheet-by-sheet basis to provide the same printing orientation on said first side and said second side, using said processor.

3. The method according to claim 1, further comprising detecting a presence of a pre-printed form on said print media, using said processor.

4. The method according to claim 1, further comprising aligning printing performed by said marking device with said patterns detected, using said processor.

5. A method comprising:

receiving, in a printing device, a print job comprising content for use on pre-printed media, said pre-printed media having pre-printed markings thereon prior to printing said print job;

feeding print media from a print media storage device to a paper path of said printing device;

feeding said print media along said paper path from said print media storage to a scanner positioned along said paper path;

feeding said print media along said paper path from said scanner to a marking device positioned along said paper path, said scanner being positioned between said print media storage device and said marking device along said paper path, said scanner scanning said print media as said print media travels along said paper path before said print media reaches said marking device to produce scanned data;

performing optical character recognition on said scanned data using a processor operatively connected to said scanner and said marking device to determine whether said pre-printed markings are present on said print media;

controlling actions of said marking device based upon characters detected during said optical character recognition to change said content of said print job by selectively adding said pre-printed markings to said content based on said pre-printed markings not being present on said print media using said processor; and printing markings on said print media using said marking device.

6. The method according to claim 5, further comprising matching an orientation of markings on a first side of said print media to an orientation of print markings to be printed on a second side of said print media by said marking device on a sheet-by-sheet basis to provide the same printing orientation on said first side and said second side, using said processor.

7. The method according to claim 5, further comprising detecting a presence of a pre-printed form on said print media, using said processor.

8. The method according to claim 5, further comprising aligning printing performed by said marking device with said characters detected during said optical character recognition, using said processor.

9. A printing apparatus comprising:

a print media storage device storing print media;

a paper path adjacent said print media storage device, said print media traveling along said paper path after being removed from said print media storage device;

a marking device positioned along said paper path, said marking device printing markings on said print media as said print media travels along said paper path;

a scanner positioned along said paper path between said print media storage device and said marking device, said scanner scanning said print media as said print media travels along said paper path before said print media reaches said marking device to determine whether pre-printed markings are present on said print media; and a processor operatively connected to said scanner and said marking device, said processor receiving a print job comprising content for use on pre-printed media, said pre-printed media having said pre-printed markings thereon prior to printing said print job;

said processor controlling actions of said marking device based upon patterns of markings detected on said print media by said scanner to change said content of said print job by selectively adding said pre-printed markings to said content based on said pre-printed markings not being present on said print media.

10. The printing apparatus according to claim 9, said processor matching an orientation of markings on a first side of said print media to an orientation of print markings to be printed on a second side of said print media by said marking device on a sheet-by-sheet basis to provide the same printing orientation on said first side and said second side.

11. The printing apparatus according to claim 9, said processor detecting a presence of a pre-printed form on said print media.

12. The printing apparatus according to claim 9, said processor aligning printing performed by said marking device with said patterns detected.

13. A non-transitory computer storage medium readable by a computerized device, said non-transitory computer storage medium storing instructions executable by said computerized device to perform a method comprising:

receiving, in a printing device, a print job comprising content for use on pre-printed media, said pre-printed media having pre-printed markings thereon prior to printing said print job;

feeding print media from a print media storage device to a paper path of said printing device;

feeding said print media along said paper path from said print media storage to a scanner positioned along said paper path;

feeding said print media along said paper path from said scanner to a marking device positioned along said paper path, said scanner being positioned between said print media storage device and said marking device along said paper path, said scanner scanning said print media as said print media travels along said paper path before said print media reaches said marking device to determine whether said pre-printed markings are present on said print media;

controlling actions of said marking device based upon patterns of markings detected on said print media by said scanner to change said content of said print job by selectively adding said pre-printed markings to said content based on said pre-printed markings not being present on said print media using a processor operatively connected to said scanner and said marking device; and printing markings on said print media using said marking device.

14. The non-transitory computer storage medium according to claim 13, said method further comprising matching an orientation of markings on a first side of said print media to an orientation of print markings to be printed on a second side of said print media by said marking device on a sheet-by-sheet basis to provide the same printing orientation on said first side and said second side, using said processor.

15. The non-transitory computer storage medium according to claim 13, said method further comprising detecting a presence of a pre-printed form on said print media, using said processor.

16. The non-transitory computer storage medium according to claim 13, said method further comprising aligning printing performed by said marking device with said patterns detected, using said processor.

* * * * *